July 11, 1944.  A. B. SIMMONS ET AL  2,353,272

BORE SIGHTING INSTRUMENT

Filed July 9, 1942  2 Sheets-Sheet 1

ARTHUR B. SIMMONS
JOHN H. EAGLE
INVENTORS

BY *Newton M. Perrins*
*Donald H. Stewart*
ATTORNEYS

July 11, 1944.   A. B. SIMMONS ET AL   2,353,272
BORE SIGHTING INSTRUMENT
Filed July 9, 1942   2 Sheets-Sheet 2
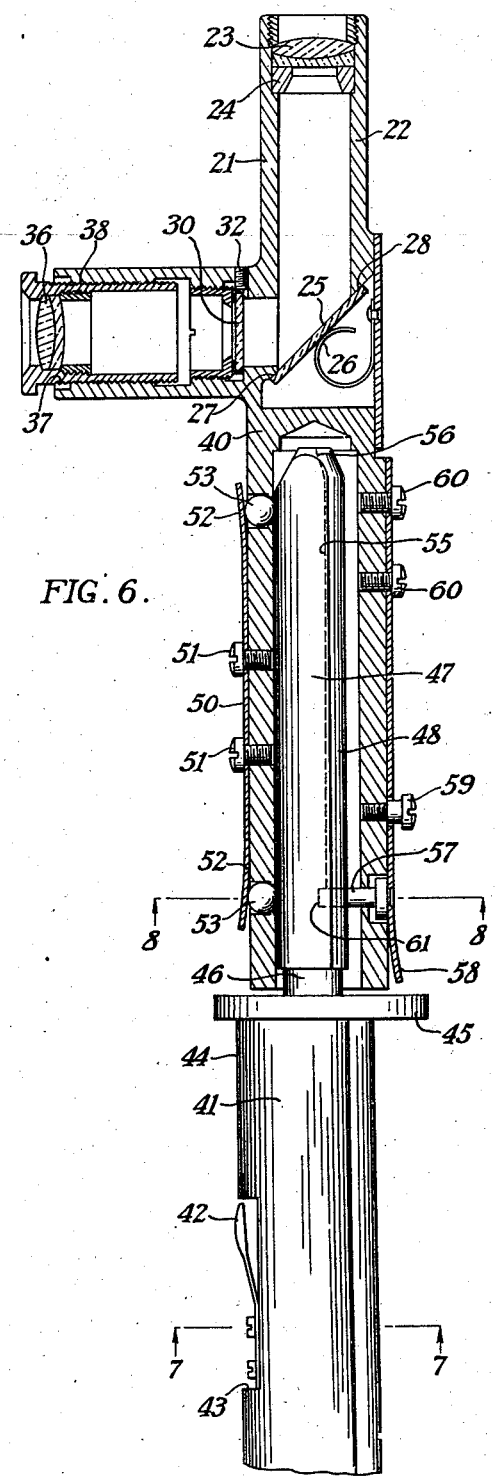
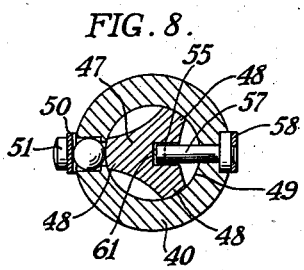
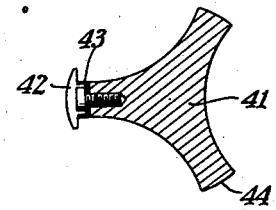
ARTHUR B. SIMMONS
JOHN H. EAGLE
INVENTORS
BY
ATTORNEYS Patented July 11, 1944

2,353,272

UNITED STATES PATENT OFFICE 2,353,272

BORE SIGHTING INSTRUMENT

Arthur B. Simmons and John H. Eagle, Rochester, N. Y., assignors to Eastman Kodak Company, Rochester, N. Y., a corporation of New Jersey Application July 9, 1942, Serial No. 450,238

4 Claims. (Cl. 88—1)

This invention relates to a bore sighting instrument which may be used in properly aligning a number of guns with a sighting device or aligning a gun and sight, particularly in cases where the breech of the gun is not readily available.

In initially setting up guns in airplanes, particularly where the guns may be spaced from a sighting instrument, it is necessary to provide some means for aligning the guns with the sight. It is also necessary from time to time to check the guns with the sights to be sure their alignment is maintained while in use.

In many airplanes there may be one or more guns spaced from a sighting instrument, and these guns may be mounted to move or may be fixedly mounted inside of the wings of a plane so that the usual method of sighting through the gun barrel is not suitable because in many instances the breeches of the guns are in inaccessible positions.

Our invention is particularly directed to provide an optical instrument by which an image which may be viewed accurately along the axis of a gun may be reflected to a viewable position near the muzzle of the gun so that this instrument can be used for obtaining the desired alignment.

In some instances the guns are aligned so that their axes converge on a predetermined point, and in others their axes may be arranged in parallel relationship. Our optical instrument is adapted for use in setting up the guns in any desired position, since it provides an optical means which can be used at the muzzle of a gun for directing the axis thereof to any desired target.

One object of our invention is to provide a simple type of instrument which can be accurately positioned in the muzzle of a gun and which will accurately provide a means for sighting along the axis of the gun. Another object of our invention is to provide a bore sighting instrument which can be quickly applied to and disengaged from a gun even though it may be placed in a relatively inaccessible position. Another object of our invention is to provide an optical bore sighting instrument which can be used for fire arms having different bores. Still another object of our invention is to provide a bore sighting instrument which can be used in guns in which the bore has increased in size due to wear or other variations. Other objects will appear from the following specification, the novel features being particularly pointed out in the claims at the end thereof.

Coming now to the drawings in which like reference characters denote like parts throughout:

Fig. 6 is part section and part elevation of a gun sighting instrument constructed in accordance with a second embodiment of our invention.

Fig. 7 is a section taken on line 7—7 of Fig. 6.

Fig. 8 is a section taken on line 8—8 of Fig. 6, and

Fig. 9 is an enlarged view of the reticle as it would appear when the bore sighting instrument is sighted on a distant object.

Our invention comprises broadly providing an optical instrument of simple nature with an aligning rod which can be thrust into the bore of a gun, the optical part of the instrument producing an image accurately along the axis of the rod and reflecting it to an accessible position adjacent the muzzle of a gun so that by altering the position of the gun and viewing the object or target through the optical instrument the gun may be positioned as desired.

Figure 1:
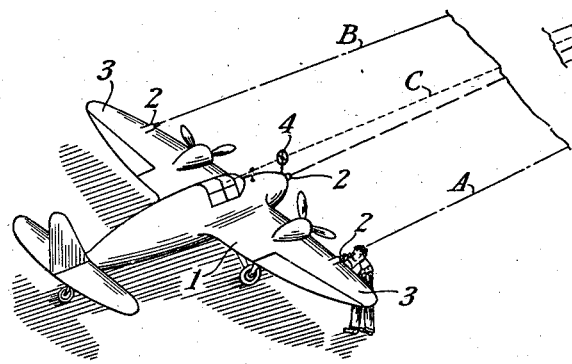
Fig. 1 is a perspective and schematic view illustrating a plane having a sighting device and guns which may be aligned with our improved form of bore sighting instrument.

For instance, if an airplane, as indicated in Fig. 1, is provided with guns 2 which may be partially or entirely enclosed in the wings 3 of the airplane and is to have the guns aligned with a sighting device diagrammatically shown at 4, our improved instrument may be used to direct the axis A of the right-hand gun to a suitable target T so that by directing the axis B of the left-hand gun to the same target, and by directing the sighting device axis C to the same target, the guns may be properly aligned. Sometimes it is desirable to have the target T at infinity, and sometimes it is desirable to have the guns' axes A and B either converging toward the axis C or in some non-parallel relation thereto. This can readily be accomplished by selecting the desired type of target or by utilizing more than one target if desired.

Figure 2:
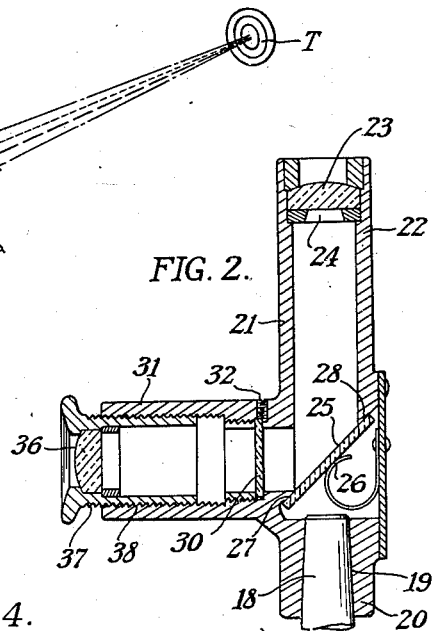
Fig. 2 is a part section and part plan view of a bore sighting instrument constructed in accordance with and embodying a preferred form of our invention.
Figure 3:
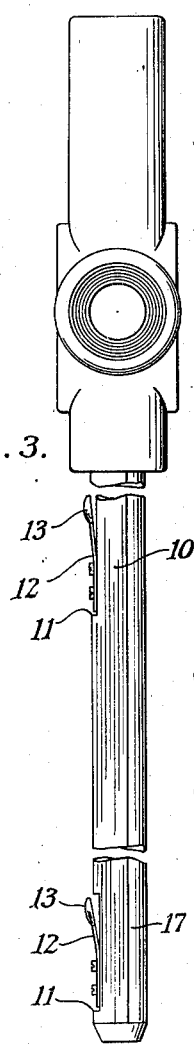
Fig. 3 is a top plan view of the instrument shown in Fig. 2.
Figure 4:
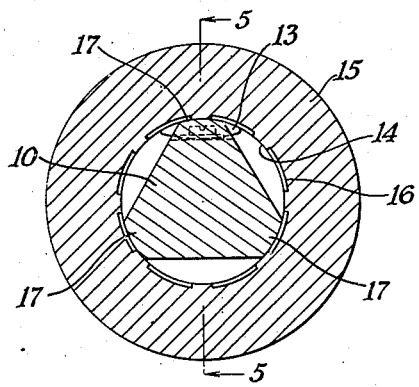
Fig. 4 is an enlarged fragmentary section through a typical gun barrel in which a bore sighting instrument has been inserted.
Figure 5:
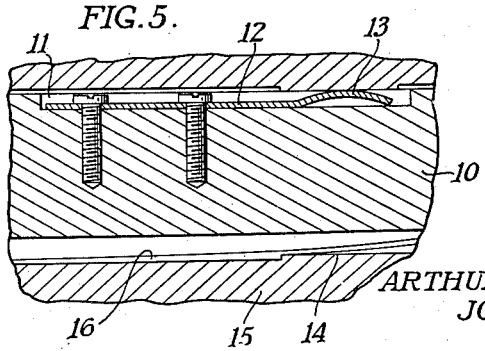
Fig. 5 is a fragmentary section view taken on line 5—5 of Fig. 4.

Our gun sighting instrument, as indicated in Fig. 2, may comprise an aligning rod 10 preferably provided with recessed seats 11 in which spring arms 12 are mounted, these arms terminating in rounded ends 13 which are designed to slide into the bore 14 of a gun barrel 15. The gun barrel contains rifling 16, and in order to accurately align the rod 10 with the gun barrel it is preferably provided with three spaced walls 17 which are of a shape to closely approximate the inside curvature of the gun bore 14. However, a few thousands clearance may be provided between one of the areas 17 and the gun bore, this clearance being taken up by the spring members 13 which are seated in one of the areas or ribs running longitudinally of the rod. Thus the rod 10 has a smooth and close fit with the gun bore so that the axis of the rod 10 either coincides with the axis of the bore 14 or lies parallel and closely adjacent thereto.

The rod 10 may include a reduced shank 18 which closely fits a tapered opening 19 in an end 20 of the housing 21 which contains the optical part of the instrument.

As shown in Fig. 2, this housing is roughly L-shaped in cross section, the forward tubular end 22 supporting an objective 23 in front of a diaphragm 24 so that light pencils passing through the objective 23 may be reflected at an angle to the axis of the rod 10 by means of a mirror 25 pressed by a spring 26 against locating shoulders 27 and 28.

The mirror 25 reflects an image to the reticle 30 which is adjustably mounted in the tube 31 by means of three set screws 32, so that the reticle can be initially aligned with the axis of the rod 10. As shown in Fig. 9, the reticle is provided with an engraved circular line 33 which is set up so that when the instrument is checked by rotating it with the rod 10 engaging the bore of the instrument, an image I formed by the objective 23 will remain stationary and properly centered on the reticle, as indicated in Fig. 9.

The tubular member 31 also contains an eyepiece 36 which may be moved backward and forward for adjustment on the thread 37 which mates with a thread 38 inside of the tubular member 31. Thus an image of the target may be reflected, in this instance at right angles to the axis of the gun bore 14, and if such an instrument is used on the plane shown in Fig. 1, the user may observe the image from the front edge of the plane's wing and still may be sure that he is accurately sighting along the axis of the bore of the gun supporting the instrument.

It is frequently desirable to provide an instrument which can be used on guns of different caliber, and accordingly the instrument shown in Fig. 6 may be used. Since the optical parts of this instrument are like those above described, they will not be again separately described and will be given the same reference characters. The only different part is the rear tube 40 which differs from the tube 20 in that it is adapted to take aligning rods of different size.

For instance, Fig. 6 shows an aligning rod 41 of a much larger size than the aligning rod 10. Like aligning rod 10, it includes spring members 42 seated in cutouts 43 in the longitudinal walls 44, and it may be provided with a flange 45 on the outer end which will not slide into the gun bore.

From the flange 45 a neck 46 extends upwardly to support a rod 47 which may be roughly triangular in cross section, as indicated in Fig. 8. As also indicated in this figure, the rod 47 may include curved faces 48 closely fitting the bore 49 of part 40 of the instrument and having a smooth sliding fit therewith. In this case tubular member 40 is provided with a spring member 50 which may be attached to the tubular member as by screws 51. The ends 52 of this spring member bear on balls 53 which thrust against one of the curved walls 48 of the rod 47, thrusting the other two curved walls 48 into contact with the bore 49.

In order to prevent the rod 47 from being inserted except in one position we provide a groove 55 rounded outwardly at 56 to form a guideway for a latch element consisting of a pin 57 carried on the end of a spring 58, the outward movement of which may be limited by a stud 59. This spring may be attached as by screws 60 to hold the latch member 57 in position. The latch member may slide through the groove 55 until a second latch element 61 is reached, this latch element, as best shown in Fig. 8, consisting of an aperture to receive the latch 57 arranged at the end of the groove. Thus it is only necessary to thrust the rod 47 when properly positioned into the tubular part 40 of the optical instrument in order to mount it accurately on the end of an aligning rod which has an outside shape to fit into the desirable size gun. It is obvious that any number of these supporting rods may be provided of different sizes so that a single optical instrument constructed as indicated in Fig. 6 may be used for aligning guns of different sizes.

The operation of the device is extremely simple. When it is desired to align up a gun and a sight or several guns and a sight, a target may be selected such as, for instance, a church steeple, as indicated at I in Fig. 9. The sighting instrument is then selected, and the aligning rod is thrust into the muzzle of the gun into which it closely fits by virtue of the spring members which force two longitudinal walls of the aligning rod against the inside walls of the gun bore. The operator then looks through the eyepiece 36 and adjusts the gun until the target I is properly centered, and then if he desires, he may check the reading by turning the tubular member 31 in different positions about the gun barrel. If the image I remains in a fixed position, the optical instrument is properly aligned, and the axis of the gun will be directed to the proper target. If, however, the target moves without moving the gun, it may be necessary to adjust the reticle 30 by means of the three adjusting screws until the image is centered and remains stationary when the instrument is turned.

By repeating this operation for each gun, the guns may all be aligned with access only to the muzzle of the gun.

If it is desired to direct the guns to an object closer than infinity, this can readily be accomplished by providing several targets or by selecting as a target an image at the desired distance. In any event, it will be seen that our optical instrument provides a means for rapidly initially aligning guns with a target when they are assembled in a plane and also provides a light and accurate instrument which may be used in the field at any time to check the alignment of guns without access to the breech of the gun and without the necessity of actually firing at known targets and adjusting the gun after the position of the shot is determined.

Since it is obvious that our invention may take various different forms and is not confined to the specific forms illustrated in the drawings, we consider as within the scope of our invention all such forms as may come within the terms of the appended claims.

We claim:

1. A bore sighting instrument for guns comprising an alignment rod, three spaced walls thereon extending longitudinally thereof and having a curvature approximating that of a gun barrel bore, spring members supported on said rod and extending outwardly therefrom and adapted to resiliently engage the gun bore pressing two spaced walls into contact therewith, an optical instrument including a housing adapted to be carried by the aligning rod, said optical instrument including means for projecting an image in axial alignment with said aligning rod to a position at one side of said rod, and means for connecting said optical instrument housing to the alignment rod comprising a spring latch member carried by the housing and a latch guiding groove formed in the aligning rod and extending to a latch element at the end of said groove whereby the aligning rod and housing may be latched together in only one position.

2. A bore sighting instrument for guns comprising an alignment rod, three spaced walls thereon extending longitudinally thereof and having a curvature approximating that of a gun barrel bore, spring members supported on said rod and extending outwardly therefrom and adapted to resiliently engage the gun bore pressing two spaced walls into contact therewith, an optical instrument including a housing adapted to be carried by the aligning rod, said optical instrument including means for projecting an image in axial alignment with said aligning rod to a position at one side of said rod, and means for connecting said optical instrument housing to the alignment rod comprising a socket of a size to receive a portion of said aligning rod, and resilient means for pressing walls of said rod into contact with said socket.

3. A bore sighting instrument for guns comprising an alignment rod, three spaced walls thereon extending longitudinally thereof and having a curvature approximating that of a gun barrel bore, spring members supported on said rod and extending outwardly therefrom and adapted to resiliently engage the gun bore pressing two spaced walls into contact therewith, an optical instrument including a housing adapted to be carried by the aligning rod, said optical instrument including means for projecting an image in axial alignment with said aligning rod to a position at one side of said rod, and means for connecting said optical instrument housing to the alignment rod comprising a socket of a size to receive a portion of said aligning rod, and resilient means for pressing walls of said rod into contact with said socket, and means for holding the portion of the rod in the socket including latch elements on the rod and housing.

4. A bore sighting instrument for guns comprising an alignment rod, three spaced walls thereon extending longitudinally thereof and having a curvature approximating that of a gun barrel bore, spring members supported on said rod and extending outwardly therefrom and adapted to resiliently engage the gun bore pressing two spaced walls into contact therewith, an optical instrument including a housing adapted to be carried by the aligning rod, said optical instrument including means for projecting an image in axial alignment with said aligning rod to a position at one side of said rod, and means for connecting said optical instrument housing to the alignment rod comprising a socket of a size to receive a portion of said aligning rod, and resilient means for pressing walls of said rod into contact with said socket, a groove in a wall of a portion of the rod in the socket, the latch element on the rod comprising an aperture at the end of the groove, the latch element on the socket comprising a spring pin of a size to slidingly engage the groove for guiding the alignment rod into the socket and to snap into the aperture to latch the rod to the housing when a predetermined position is reached.

ARTHUR B. SIMMONS.
JOHN H. EAGLE.